United States Patent [19]

Malvern

[11] Patent Number: 4,969,157
[45] Date of Patent: Nov. 6, 1990

[54] RING LASER GYROSCOPE WITH HOLLOW CATHODE HAVING FRUSTO-ELLIPSOIDAL SURFACE

[75] Inventor: Alan R. Malvern, Ascot, England
[73] Assignee: British Aerospace Public Limited Company, London, England
[21] Appl. No.: 339,532
[22] Filed: Jan. 15, 1982
[30] Foreign Application Priority Data
Jan. 17, 1981 [GB] United Kingdom ............... 8101443
[51] Int. Cl.$^5$ ...................... H01S 3/083; H01J 17/06; H01J 61/09
[52] U.S. Cl. ..................................... 372/94; 313/618; 313/619; 313/632; 313/633
[58] Field of Search ............... 313/618, 619, 632, 633; 372/88, 87, 94, 85

[56] References Cited
U.S. PATENT DOCUMENTS
1,991,728  2/1935  Brockway ........................... 313/618
4,007,431  2/1976  Abbink et al. ................... 313/632 X
4,257,015  3/1981  Ljung ..................................... 372/87
4,392,229  7/1983  Hostetler .......................... 372/87 X
4,632,555  12/1986  Malvern ............................ 372/94 X FOREIGN PATENT DOCUMENTS
584661  5/1979  U.S.S.R. ............................. 313/632

OTHER PUBLICATIONS
"Side Cathode for Powerful Argon Laser", by A.G. Maltsey, Instrum. & Exp. Tech. (USA), vol. 22, No. 4, pp. 1134–1136, Publ. Feb., 1980.

Primary Examiner—Palmer C. DeMeo
Attorney, Agent, or Firm—Cushman, Darby & Cushman

[57] ABSTRACT

A cathode (12) for a glow discharge device and comprising a hollow body provided with an opening and having an internal working surface (18) which is substantially frusto-ellipsoidal. The cathode has particular application to a laser gyroscope.

12 Claims, 2 Drawing Sheets

RING LASER GYROSCOPE WITH HOLLOW CATHODE HAVING FRUSTO-ELLIPSOIDAL SURFACE

This invention relates to electrodes for glow discharge devices and has particular, but not exclusive, reference to ring laser gyroscopes.

BACKGROUND OF THE INVENTION

The cathode of a normal glow discharge tube is usually contained within a glass envelope and typically is constructed in the form of a cylinder open at both ends. The metal or other electrically conductive material of which a cathode is constructed has appropriate cathodic properties, namely a resistance to sputtering and a good electron emission characteristic. As is well known, the principal mechanism of operation of a cathode is the release of electrons by the impact thereon of high energy positive ions, the released electrons being repelled by the cathode on the electric field or discharge.

Unfortunately, the impact on the cathode of high energy positive ions can also cause the release of atoms of the metal of which the cathode is constructed, which atoms may be deposited on areas in the vicinity of the cathode. This process is known as sputtering and is well known to be deleterious to cathode operation. The action of sputtering exposes fresh metal on the cathode which might absorb certain gases present in the glow discharge device and hence give rise to a gettering effect, the absorbed gases possibly becoming buried if some of the sputtered material is redeposited on the cathode.

It has been found that sputtering is prevalent when the cathode current density is high and so a cathode having a configuration which gives rise to high current density regions or "hot spots" will tend to exhibit sputtering and gettering characteristics, the former being undesirable but the latter advantageous. High current density regions have been found to be associated with discontinuous surfaces on a cathode such as are presented by corners or points, for example. Thus it is desirable to avoid discontinuous surfaces in a cathode in order to maintain the electric field in the glow discharge device at as uniform a value as possible.

In the case of a ring laser gyroscope, it is usual to dispense with the glass envelope so that the cathode itself forms the envelope which needs to be gas tight and to have an opening for communication with the lasing path of the gyroscope. Furthermore, the cathode has to be sealed in a gas tight and physically secure manner to a block or other construction in which the lasing path is provided. Thus the cylinder open at both ends used as a cathode in other glow discharge devices as discussed above is of no use in a ring laser gyroscope. If one end of the cylinder were to be closed by an end cap or plate extending generally transverse to the longitudinal axis, this would give rise to a discontinuous surface within the cylinder due to the "corner" at the transition between the end cap or plate and the cylindrical body. It will be appreciated that such a discontinuity can be minimised by curving the interface between the cylindrical body and the end cap and indeed cathodes are known having cylindrical bodies with hemispherical ends.

However, there is another important consideration appertaining to cathodes, namely discharge "noise" which is created by oscillations in the glow discharge. In a laser gyroscope, discharge noise imposes itself on the laser beams and, depending on the severity, may firstly manifest itself as a significant content of the gyroscope output signal giving rise to a degraded gyroscope performance, and as a factor making the control of the round trip path length of the laser difficult to effect. It is important that the round trip path length of the laser in a laser gyroscope is controlled within very stringent limits because change in path length is the essence of operation of such a gyroscope, whereby changes due to any factor other than that which is to be measured (i.e. that due to rotation of the gyroscope about its sensitive axis) have to be eliminated. In the context of discharge noise, it has been found that cathodes with cylindrical bodies and curved or hemispherical ends exhibit an inferior characteristic in this respect albeit they have a desirable low sputtering characteristic as discussed above. In contrast, conical and square-ended cathodes have very good discharge noise characteristics but high sputtering characteristics. Thus, to date, there has existed a direct conflict between the sputtering and discharge noise characteristics of a cathode for a given configuration thereof.

SUMMARY OF THE INVENTION

The present invention turns on the discovery that, contrary to expectation, a cathode with a particular form of curved surface exhibits a good noise characteristic as well as a good anti-sputtering characteristic.

According to the present invention a cathode for a glow discharge device comprises a hollow body provided with an opening and having an internal working surface which is substantially frusto-ellipsoidal.

In a preferred embodiment, the internal working surface of the cathode is semi-ellipsoidal with the opening lying in a plane coincident with the plane containing the minor axis of the ellipsoid. A mounting flange may be provided around the cathode opening by which the cathode is mounted on, and sealed to, a mounting surface of a laser gyroscope or other glow discharge device with which it is to be used. Since the mounting of the cathode on the glow discharge device, via the flange or otherwise, gives rise to a discontinuity of the cathode working surface by virtue of the "corner" at the cathode/mounting surface interface, it is preferable to shield this corner using a re-entry member which is disposed within the cathode and has a passage therethrough which connects the interior of the cathode with the glow discharge path of the associated glow discharge device.

BRIEF DESCRIPTION OF DRAWINGS

A cathode constructed in accordance with the present invention and applied to a laser gyroscope will now be described in greater detail, by way of example, with reference to the accompanying drawings, in which.

DESCRIPTION OF THE PREFERRED EMBODIMENT

Figure 1:
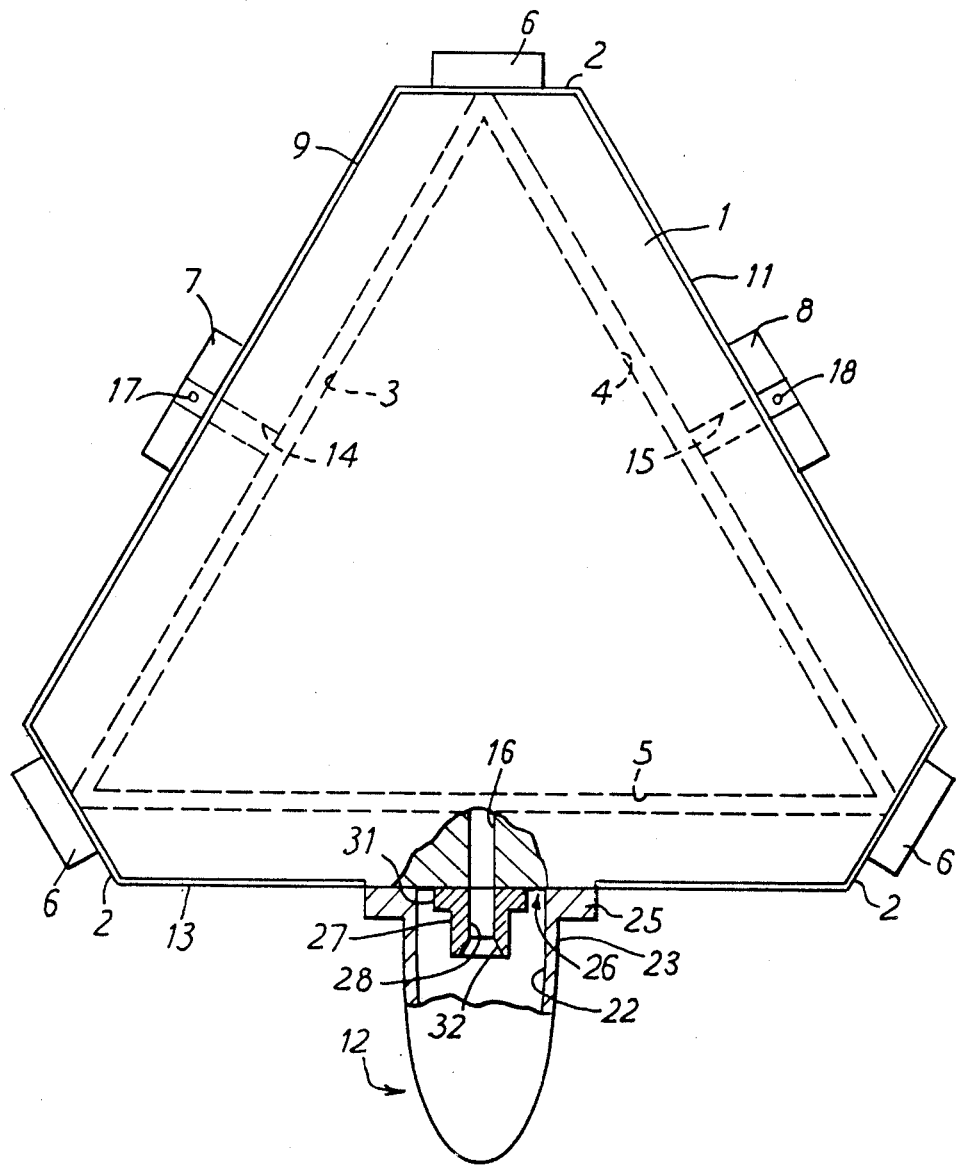
FIG. 1 is a schematic plan view of the laser gyroscope fitted with the cathode.
Figures 2, 3:
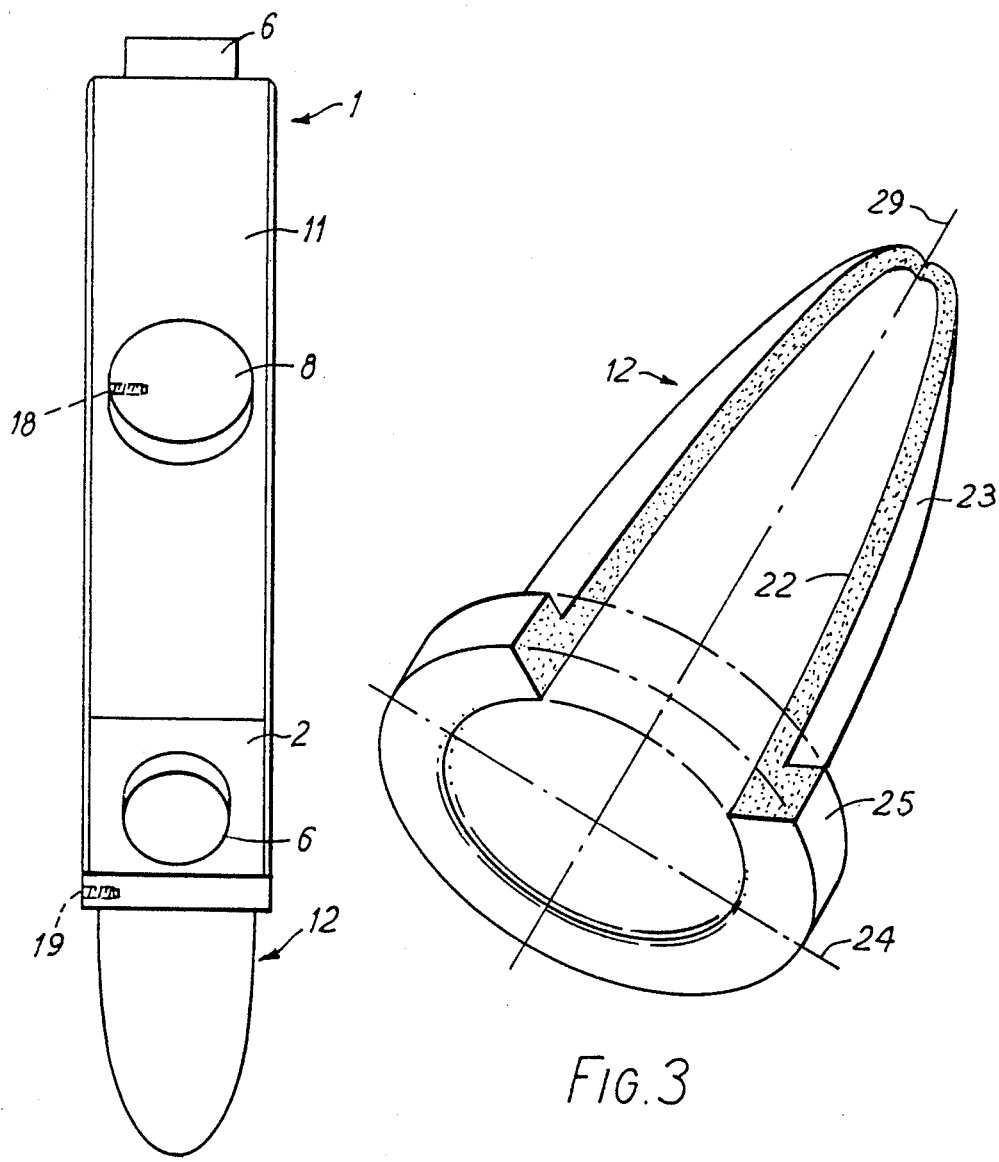
FIG. 2 is a view from the right of FIG. 1.
FIG. 3 is a perspective view of the cathode to a larger scale and partly in section.

Referring to FIGS. 1 and 2, the cavity of the laser gyroscope is constructed from a block 1 of a material which is non-metallic and has a low coefficient of expansion. A preferred material is that known under the trade name Zerodur. The block 1 is in the shape of an equilateral triangle, as seen in plan view, with the apices cut at right angles to the respective bisectors to provide planar mounting surfaces 2. The block 1 is drilled parallel to each side to provide three limbs 3, 4 and 5 which together form the so called cavity of the laser gyroscope in which glow discharge or, more specifically, lasing takes place. The cavity is continuous by virtue of the limbs 3, 4 and 5 extending from one mounting surface 2 to another, whereby two limbs intersect at each surface 2. A mirror 6 is sealed to each surface 2.

Communicating with the cavity are two anodes 7 and 8 mounted mid-way along sides 9 and 11, respectively, of the block 1, and a cathode 12 mounted mid-way along the side 13 of the block. The anodes 7 and 8 and the cathode 12 are sealed in a gas-tight manner to the block 1, as are the mirrors 6, and communicate with the cavity through respective bores 14, 15 and 16 extending between the associated limbs 3, 4 and 5 and sides 9, 11 and 13. The cavity is filled with an inert gas, typically a mixture of helium and neon. Each anode 7 and 8 is provided with a threaded bore 17 and 18, respectively, (FIG. 1) to receive an electrical contact (not shown). Since the cavity is permanently sealed once it has been filled with the inert gas, it is essential to maintain the purity of the gas otherwise once the gas becomes degraded beyond a certain limit, it is impossible to effect lasing. To this end a getter is provided (not shown).

Referring more specifically to FIG. 3, the cathode 12 is constructed in accordance with the present invention and has a hollow body open at one end. Both the interior working surface 22 (i.e. cathodic surface) and the exterior surface 23 of the cathode 12 are substantially frusto-ellipsoidal in the sense that the cathode is an ellipsoid cut into half along the minor axis 24. A flange 25 is formed at the open end of the cathode 12 by which the latter is mounted on, and sealed to, the block 1. A threaded bore 19 (FIG. 2) is provided in the flange 25 for the reception of an electrical contact (not shown). The cathode is composed of an aluminium alloy (preferably to British Standard L65 - American Standard 2024) but can be made of any material having cathodic properties. The method of manufacture may be by machining from the solid or by spinning from sheet material, for example, and it is not necessary to have the exterior surface 23 of frusto-ellipsoidal shape. However, to have a frusto-ellipsoidal exterior surface gives a weight reduction which can be important in relation to providing a good seal between the cathode 12 and block 1 in that the less weight the seal has to support the better.

Since the mounting of the cathode 12 on the block 1 gives rise to a discontinuity in the interior working surface 22 by virtue of the "corner" 26 at the cathode/block interface, it is desirable to shield the discontinuity so that it is in fact eliminated from the cathode working surface and to this end a re-entry member 27 is provided (FIG. 1). The re-entry member is tubular, having an axial bore 28 coincident with the major axis 29 of the ellipsoid and formed with a flange 31 by which it is mounted on the block 1 such that the bore 28 is in alignment with the bore 16 in the block. The bore 28 is counterbored at 32 at the end remote from the block 1 such that the counterbore flares outwardly from the main bore 28 into the interior of the cathode 12.

In the illustrated embodiment the length of each limb 3, 4 and 5 of the gyroscope cavity is 14.3 mm. and the size of the cathode 12 is such that the interior surface 18 has a semi-major axis of 55 mm. and a semi-minor axis of 12 mm. giving an actual working surface area of 40 cm$^2$. With these dimensions and the aluminium alloy construction, the cathode 12 has been found to sustain a glow discharge in the gyroscope cavity down to 0.025 mA cm$^{-2}$, allowing a current of 4 mA to be used at a current density below 0.1 mA cm$^{-2}$.

In operation of the laser gyroscope, the anodes 7 and 8 and the cathode 12 are energised such as to effect and maintain lasing of the helium/neon mixture, or other gas, contained within the cavity and hence provide contra-rotating beams of light as is conventional in laser gyroscopes and which are directed around the cavity by the mirrors 6. The frusto-ellipsoidal working surface 22 of the cathode 12 has been found to exhibit a low sputtering characteristic, particularly with the use of the re-entry member 27, and to exhibit, contrary to expectation, a good discharge oscillation or noise characteristic.

Inasmuch as the larger the working surface 22 of the cathode 12 the smaller the current density which is desirable from the sputtering standpoint (consistent with operating in the normal glow regime), the open end of the cathode can be provided at any point along the major axis 29 but it has been found convenient to use a substantially semi-ellipsoidal working surface It will be appreciated that FIGS. 1 and 2 only show the basic component of the laser gyro and this only schematically. A cathode constructed in accordance with the invention can be employed in any form of laser gyro and indeed with any laser or other type of glow discharge device.

I claim:

1. In a ring laser gyroscope having a cathode, a pair of anodes spaced therefrom and mirrors spaced between said cathode and said anodes and between said anodes, the improvement wherein the cathode comprises a hollow electrically conductive body provided with an opening and having an internal working surface which is substantially frusto-ellipsoidal for providing a stable discharge with a reduction of both hot spots and noise.

2. A ring laser gyroscope cathode according to claim 1, wherein said internal working surface is semi-ellipsoidal with the opening in the body lying in a plane coincident with the plane containing the minor axis of the ellipsoid.

3. A ring laser gyroscope cathode according to claim 1 wherein a flange is provided around the opening in the body by which the cathode can be mounted on the gyroscope.

4. A ring laser gyroscope cathode according to claim 1 and further comprising a re-entry member disposed within the cathode and operable, in use of the cathode, to shield the junction of the cathode with the gyroscope to which it is fitted, whereby that junction does not form part of the working surface of the cathode.

5. A ring laser gyroscope cathode according to claim 4, wherein the re-entry member is tubular and has a longitudinal bore aligned with an axis of the frusto-ellipsoidal working surface, the end of the tubular member disposed remote from the associated gyroscope being counterbored with the counterbore flaring outwardly from the longitudinal bore into the interior of the cathode.

6. A ring laser gyroscope cathode according to claim 1, wherein the exterior surface of the cathode is also of substantially frusto-ellipsoidal shape.

7. A ring laser gyroscope cathode according to claim 1 wherein said cathode composed of an aluminum alloy.

8. A ring laser gyroscope cathode according to claim 1 wherein said cathode is machined from a solid block of material.

9. A ring laser gyroscope cathode according to claim 1 spun from sheet material.

* * * * *